Nov. 17, 1964        G. H. CALLUM        3,157,241
PNEUMATIC WHEEL SUSPENSIONS FOR AUTOMOTIVE VEHICLES
Filed March 29, 1962        3 Sheets-Sheet 1
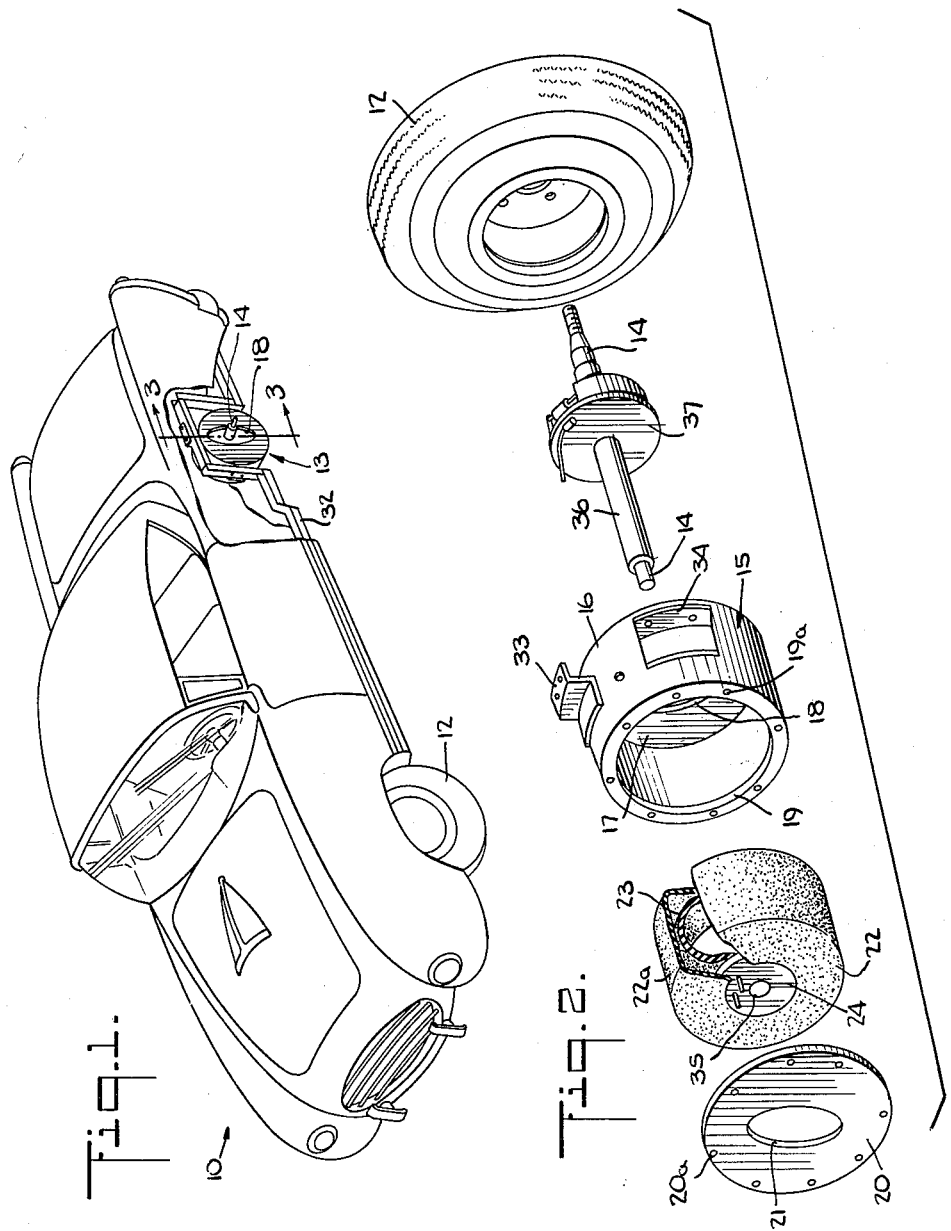
INVENTOR.
GEORGE H. CALLUM
BY *Willard R. Sprouls*
ATTORNEY

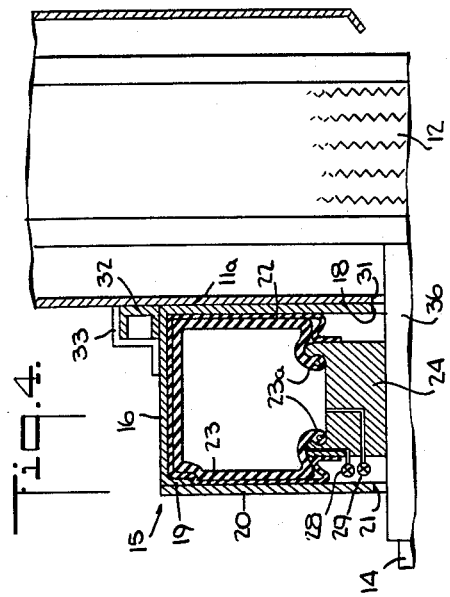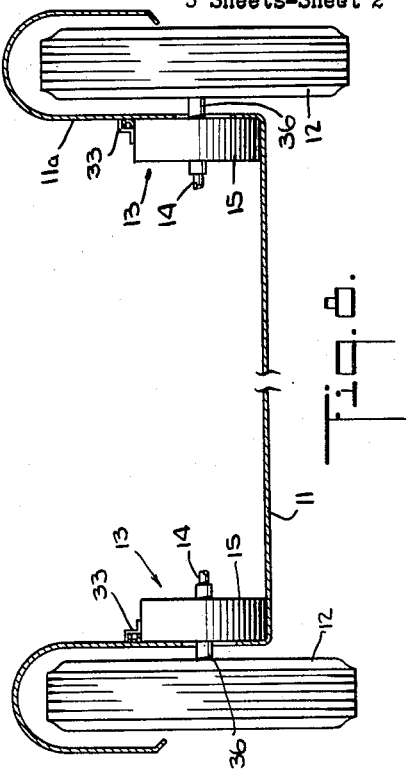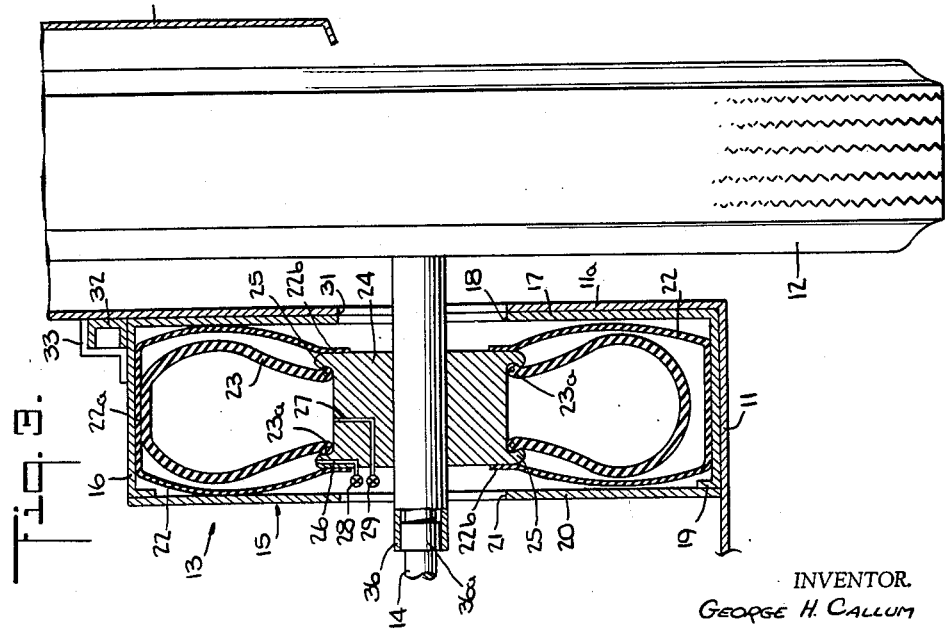

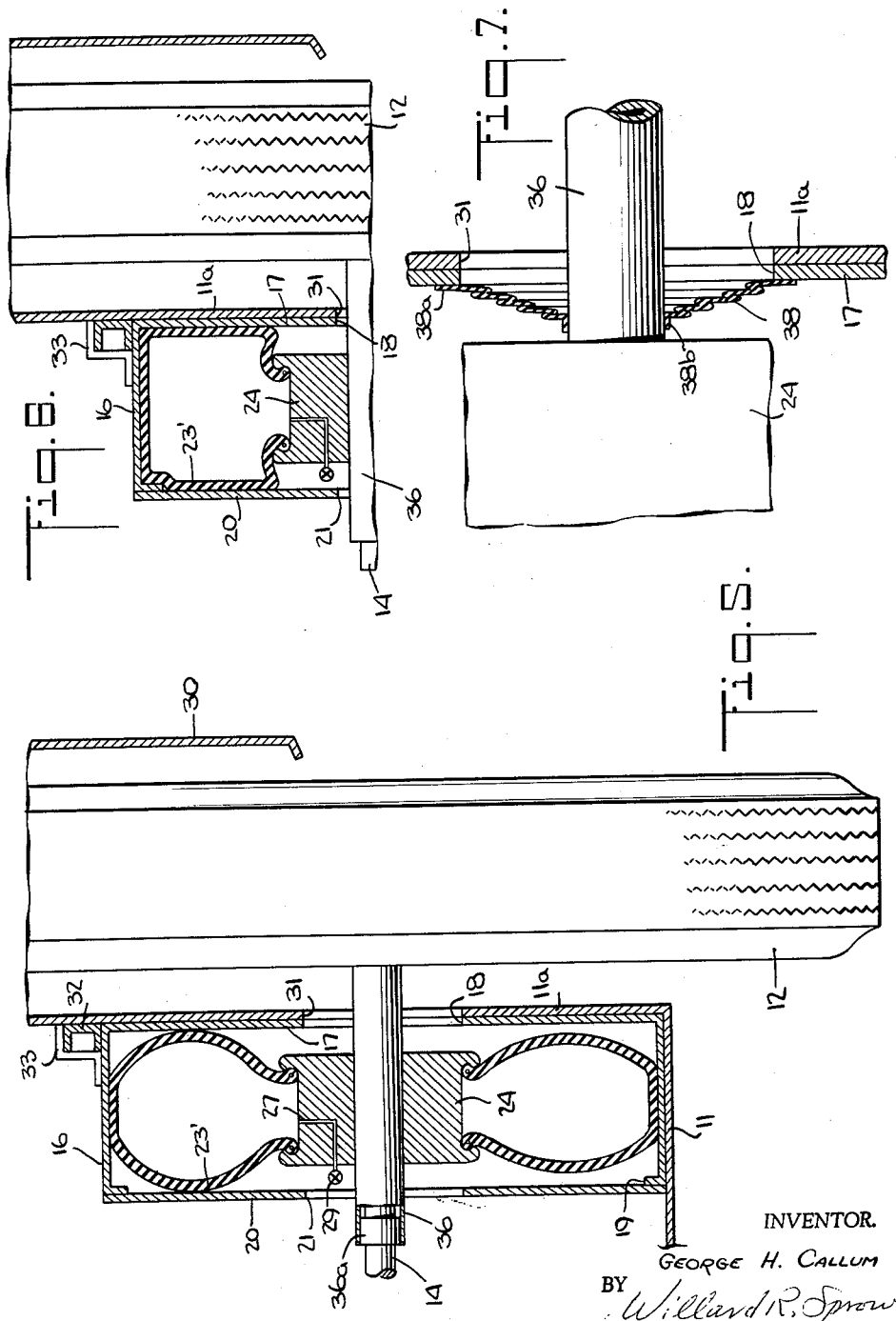

United States Patent Office 3,157,241
Patented Nov. 17, 1964

3,157,241
PNEUMATIC WHEEL SUSPENSIONS FOR
AUTOMOTIVE VEHICLES
George H. Callum, South Bend, Ind., assignor to United
States Rubber Company, New York, N.Y., a corporation of New Jersey
Filed Mar. 29, 1962, Ser. No. 183,514
13 Claims. (Cl. 180—71)

This invention relates to suspensions for wheeled vehicles, and in particular to pneumatic suspensions for automotive vehicles.

It is an object of the present invention to provide novel suspensions for automotive vehicles which completely obviate the need for the springs and shock absorbers commonly employed in such vehicles.

It is another object of the present invention to provide suspensions as aforesaid which employ air-containing cushions of rubber or rubbery materials and are particularly suited for use in amphibious vehicles.

A more specific object of the present invention is the provision of pneumatic or air cushion suspensions for vehicles in which each suspension unit comprises two individually inflatable and concentric flexible annular chambers arranged one within the other, the inner one serving as the actual load bearing member, and the outer one serving to seal the interior of the vehicle body in a watertight manner from the outside.

Broadly speaking, a suspension according to one aspect of the present invention is preferably constructed by mounting a pair of tire-like annular tubes or cushion members of rubber or rubberized cord fabric one inside the other on a stationary hub through which the rotatable axle of the associated wheel passes. The space within the inner one of these members is inflated to a relatively high pressure ranging between about 25 and 125 p.s.i. or more and preferably on the order of about 50 to 60 p.s.i., depending on the weight of the vehicle and its contents, while the space between the inner and outer members is maintained under relatively lower pressure conditions ranging from zero to about 0.5 p.s.i. The hub and the two cushion members are arranged in a cylindrical casing, and the outer circumferential or crown surface of the outer member is bonded to the inner surface of the cylindrical wall of the said casing. The latter is rigidly mounted on a frame member of the vehicle chassis and, in the case of an amphibious vehicle, also bonded to the inside of the underbody or hull of the said vehicle, at the wheel well thereof, whereby the bonds between the outer cushion member and the inner surface of the cylindrical casing wall and between the casing and the hull establish the seal which prevents water from getting into the interior of the hull or underbody of the vehicle.

The foregoing and other objects, characteristics and advantages of the suspensions according to the present invention will be more fully understood from the following detailed description thereof when read in conjunction with the accompanying drawings, in which:

FIG. 1 is a perspective illustration of an automotive vehicle with a part of the left rear fender broken away to show some of the mounting details of the suspension of the present invention at that location;

FIG. 2 is an exploded isometric view of a two-cushion suspension according to the present invention in association with a wheel;

FIG. 3 is a sectional view taken along the line 3—3 in FIG. 1 and illustrates the two-cushion suspension when the vehicle is at rest;

FIG. 4 is a similar but fragmentary sectional view and illustrates the suspension when subjected to a sharp increase in the load, as when the vehicle is passing over a bump;

FIG. 5 is a sectional view similar to FIG. 3 and illustrates a one-cushion suspension according to the invention when the vehicle is at rest;

FIG. 6 is a fragmentary sectional view (similar to FIG. 4) of the high-load deformation of the one-cushion suspension;

FIG. 7 is a fragmentary, partly sectional view of a dust guard construction associated with the suspensions illustrated in FIGS. 3 to 6; and FIG. 8 is a transverse section through the underbody of an amphibious automotive vehicle, such as that shown in FIG. 1, and illustrates the disposition of the suspension within the said underbody.

Referring now more particularly to FIGS. 1 and 8, it will be seen that the present invention is especially suited for use in connection with an automobile 10 of the amphibious type, i.e. one which is provided with an underbody or hull 11 within the confines of which the various operative elements of the vehicle, such as the drive shaft, the differential gears, etc. (not shown) are disposed. Each of the front and rear wheels 12 of the vehicle is provided with a respective suspension unit 13 through which the associated wheel axle 14 extends in a manner still to be described. Inasmuch as all of the various suspension units 13 in any given vehicle are identical, a description of one of them for each of the herein disclosed embodiments thereof will suffice for a complete understanding of the present invention.

As clearly shown in FIGS. 2, 3 and 4, the air cushion suspension unit 13 for the left rear wheel of the vehicle 10 comprises a hollow cylindrical casing 15 which is preferably made of any suitable high-strength and corrosion-resistant metal, e.g. steel or aluminum. The casing 15 comprises a cylindrical member or wall 16 integral at one side with a circular wall 17 in which is provided an opening 18. The opening 18 is shown in FIG. 1 as being oval or elliptical in outline, but it could just as well be circular, as long as it is larger than the diameter of the axle 14. At its other side, the cylindrical wall 16 has an inwardly turned peripheral flange 19 provided with a plurality of bolt holes 19a by means of which a removable circular face plate 20 having bolt holes 20a may be affixed to the flange so as to cover the open side of the casing 15. The plate 20 is provided with an opening 21 corresponding in shape and size to the opening 18 in the casing wall 17. In use, of course, when the casing is assembled the openings 18 and 21, if oval as shown, are disposed with their major axes vertical and parallel to one another.

Arranged within the casing 15 is a cushion structure which, according to one embodiment of the present invention, comprises an annular, substantially tire-shaped outer member 22 and an annular, substantially tire-shaped inner member 23. For reasons which will become more apparent as the description proceeds, the outer member 22 is preferably made of a highly elastic and stretchable air and water impermeable rubber film or rubberized fabric. Merely by way of example, the member 22 may be made of butyl rubber of the type presently employed in the automobile industry in the manufacture of conventional inner tubes for pneumatic tires. The inner member 23 is preferably formed of a multi-ply construction or rayon, nylon or other tire cord fabrics and rubber, as well as with an inner liner of butyl rubber (not shown) and a pair of beads 23a reinforced by suitable bundles of bead wires, and thus it resembles a conventional tubeless pneumatic tire lacking a tread. The cords making up the carcass of the member 23 are suitably positioned so as to provide for optimum strength characteristics and also to ensure that the member 23 upon inflation will assume the desired configuration. Both members thus can be made by generally conventional tire forming and curing techniques. The inner member 23 can actually be formed in an ordinary tire mold and press, while the outer member 22 can be formed in an ordinary inner tube mold, although, since it is preferred to shape the said outer member as shown in FIGS. 2 and 3 with a flat circumferential or crown portion 22a, it is also possible to form the outer member in specially contoured matched molds.

The members 22 and 23 are mounted concentrically with one another on a central hub 24 which is provided with a pair of annular peripheral flanges 25. The beads 23a of the inner member 23 are seated in respective annular grooves provided on the hub at the inner faces of the flanges 25 (in a manner very similar to the mounting of ordinary automobile tires on a wheel rim), while the outer member 22 is secured to the hub by having its innermost peripheral edges 22b bonded to the opposite flat faces of the hub substantially along the outer faces of the flanges 25. The outer surface of the flat portion 22a of the member 22 is bonded or adhesively secured to the inner surface of the cylindrical wall 16 of the casing 15. The hub 24 is provided with a pair of passageways 26 and 27 controlled by valves 28 and 29 (similar to ordinary tire valves) so as to permit the outer and inner members to be inflated individually. It will be understood that when the inner member 23 is inflated, the beads 23a will seat themselves against the flanges 25 to ensure airtightness of the joints, although, if desired, this effect may be enhanced by applying a conventional sealing compound to the beads or the flanges.

For the purposes of the present invention, the hub 24 may be made of a suitable hard rubber composition which can be treated and cured so as to have sufficient strength and rigidity. It is preferred, however, to make the hub of metal, preferably of steel, aluminum, metal alloy or like rust- and corrosion-resistant material, since this will most easily permit the strength and durability requirements of the hub to be realized.

As clearly shown in FIG. 3, the casing 15 is positioned interiorly of the underbody or hull 11 so that the side wall 17 of the casing is flush against a vertical wall 11a of the hull adjacent the wheel well defined between the said wall 11a and the left rear fender 30. The outer surface of the casing wall 17 is bonded or adhesively secured in a watertight manner to the inner surface of the wall 11a, with the opening 18 in the wall 17 being juxtaposed to and precisely overlying a similarly shaped opening 31 provided in the wall 11a. At this point it is deemed advisable to note that the hull 11 is preferably made of a hard but lightweight expanded or extruded synthetic plastic material such as is disclosed in British Patent No. 852,767, dated November 2, 1960, and is produced and marketed by the United States Rubber Company under the trademark "Royalite." This material is capable of being thermo-formed to shape and has a high strength-to-weight ratio, high impact srength and good insulating properies. Nevertheless, the said hull could just as well be made of other synthetic plastic materials, e.g. fiber glass, reinforced polyesters, etc., or even of wood or metal and shaped by means of conventional drawforming, molding or stamping techniques. Moreover, although the underbody or hull 11 is illustrated in FIG. 5 as being flat-bottomed, it is contemplated by the present invention that the hull could be produced with a streamlined design where that is necessary or desired.

The body of the vehicle 10 is provided with a pair of channel iron frame members 32, one at each side, which extend the entire length of the vehicle interiorly of the hull 11 and are rigidly connected with the chassis of the vehicle. Opposite the locations of the wheels 12 the said frame members are of inverted U-shape to accommodate the casings 15. The underbody or hull 11 is rigidly secured to these frame members in any suitable manner (not shown), most preferably at the locations of the respective casings.

Referring now again only to the left rear suspension unit 13, the casing 15 thereof is rigidly secured to the horizontal and vertical sections of the U-shaped part of the frame member 32 with the aid of a plurality of respective mounting lugs or flanges 33 and 34 (ordinarily there will be one mounting lug 33 at the top of the casing and two mounting lugs 34 at diametrically opposed locations at the sides of the casing) which are bolted to the said frame member (see FIG. 1).

Extending through a central axial bore 35 (FIG. 2) of the hub 24 is a hollow shaft 36 which is rigidly secured to the hub and constitutes the housing for the associated rear axle 14 which extends rotatably therethrough. Inasmuch as the hub 24 cannot rotate relative to the casing 15, however, by virtue of the bond between the cylindrical wall 16 of the latter and the outer surface of the flat portion 22a of the outer cushion member 22, the shaft or axle housing 36 is likewise prevented from rotating. Accordingly, the shaft 36 may also be that element of the vehicle 10 which carries the brake shoe assembly 37 which does not rotate when the vehicle is in motion. The shaft 36 extends freely through the openings 21, 18 and 31 and thus has the freedom of making both vertical reciprocal movements and horizontal movements as the wheel 12 rolls along the road surface. The axle 14 of the wheel is connected interiorly of the underbody or hull 11 to the differential and the drive shaft of the vehicle in an manner not explicitly illustrated, and conventional bearing assemblies 36a (only one of which is shown in FIG. 3) are employed between the shaft 36 and axle 14 to ensure a watertight rotating seal therebetween.

In operation, the inner cushion member 23, which constitutes the load-bearing element of the unit 13, is preferably inflated to a relatively low pressure, preferably on the order of about 10 to 25 p.s.i. The pressure may, however, range from as low as 5 p.s.i. to as high as 125 p.s.i. or more, depending on the weight of the vehicle and its contents, the riding characteristics desired, etc. The pressure in the outer cushion member 22, i.e. the space within the latter and surrounding the inner member 23, is normally maintained at a relatively low value and may range between zero and about 0.5 p.s.i. Under "no load" conditions, i.e. when the vehicle is at rest, the suspension 13 looks as shown in FIG. 3, the apex of the inner member 23 at the top thereof being in contact with the adjacent portion 22a of the outer member and somewhat flattened out so as to support the weight of the vehicle and its contents acting through the cylindrical wall 16 of the casing 15. Since the topmost point of the casing 15 is, consequently, located closer to the hub 24 than the lowermost point of the casing, the lower half of the outer member 22 is stretched slightly, but the bond between its portion 22a and the casing wall 16 is not broken due to the high elasticity of the material of which the outer member is made.

If the wheel 12 is now subjected to a sharp increase in load, say upon rolling over a bump and thus being raised relative to the body of the vehicle 10, the axle 14 and its surrounding housing or shaft 36 and therewith the hub 24 rise within the casing 15 from the positions illustrated in FIG. 3. It might be noted at this point that the contact of the wheel with the bump may also involve some horizonal displacements of the wheel axle, which would be permitted by the oval shape of the openings 18, 21 and 31, but for the purposes of this description and an understanding of the operational principles involved it will be sufficient to discuss only the vertical movements. As the aforesaid elements rise, the top half of the inner cushion member 23 is forced more and more against the outer member 22 and therethrough against the casing wall 16. As this progresses, of course, the top half of the inner member is deformed laterally as well as radially until at substantially maximum deformation (with the shaft 36 almost at the upper end of its path of vertical travel) the cushion members look as shown in FIG. 4. Concomitantly therewith, the lower half of the outer member 22 is stretched even further than as shown in FIG. 3, but the outer member is so elastic that this does not strip its portion 22a from the casing wall 16.

The same type of action takes place in the lower half of the suspension unit 13 when the wheel 12 suddenly drops relative to the body of the vehicle, for example when the latter is driven over a hole or depression in the road surface. It will be noted, however, that at no time does the portion 22a of the outer cushion member 22 become separated from the casing wall 16 to which it is initially bonded. Thus, any entry of dust, pebbles, moisture or other harmful substances into the interior of the underbody of the vehicle from the space between the wall 11a of the wheel well and the wheel 12 itself is effectively inhibited, regardless of whether the amphibious vehicle 10 is moving over a body of water or on land.

It will be apparent from a consideration of FIG. 3 that it is also essential to prevent the accumulation of pebbles, dirt, etc. in the space defined within the casing 15 between the wall 17 thereof and the adjacent side of the outer member 22. A means for achieving this goal is illustrated in FIG. 7 and comprises a corrugated rubber sleeve or collar 38 arranged concentrically with the shaft 36 and secured in a watertight manner at one end to the inner face of the casing wall 17 about the opening 18, as shown at 38a, and at its other end to the outer surface of the said shaft, as shown at 38b. The sleeve may be so secured by adhesive bonding or in any other suitable fashion, and it must, of course, be made of a rubber or rubbery material which is sufficiently flexible that no movement which the shaft 36 could make within the bounds of the openings 18 and 31 would pull the ends of the sleeve or collar loose from either the casing wall 17 or the shaft 36. The sleeve or collar 38 has been omitted from FIGS. 3 and 4 only for the sake of clarity and to avoid confusion of detail in those figures.

In view of the fact that there are four suspension units 13 located, respectively, at the four wheels 12, the vehicle is supended on a plurality of individual air cushion devices each of which has the structural and operational characteristics of the unit shown in FIGS. 2 and 3 and described hereinbefore with reference to the left real wheel of the vehicle. It will be clear from the foregoing, therefore, that the pneumatic suspension units 13 not only support the weight of the vehicle but also act as shock absorbers. As a result, a vehicle having such a suspension system gives a ride which is extremely smooth and comfortable regardless of the roughness of the terrain over which the vehicle passes.

The suspension construction according to the present invention is further advantageous by virtue of the fact that no springs are required for the vehicle, so that there are fewer parts on the vehicle which require periodic inspection and/or lubrication. Moreover, inasmuch as the inner and outer cushion members 23 and 22 are in essence not subjected to any friction other than that of the air filling the interiors of the respective members, the suspensions according to the present invention have great durability and a long useful life and generally will last for the entire life of the vehicle itself.

It will be understood that the construction hereinabove described may be modified in a number of ways without any adverse effect on the operation of the suspension. Merely by way of example, the outer member 22 may be secured at its edges 22b to the hub 24 by means of clamping rings or like fastener elements, rather than being adhesively secured to the hub as illustrated in the drawings, as long as the joint is airtight and watertight. Although the inner and outer members are illustrated (see FIG. 2) as being circular in circumference, they may just as well be square, rectangular or otherwise polygonal in shape, since they do not rotate and are subjected only to radial and transverse deformations during the operation of the vehicle.

In the embodiment of the present invention described above, the suspension comprises a two-compartment cushion structure, whereby the outer member 22, which serves as the sealing means, can be made of a much more flexible material than the inner and load-bearing member 23. It will be apparent, however, that the suspension could be modified so as to include only a single cushion member defining a single interior compartment or chamber for the pressurized air. This embodiment of the invention is illustrated in FIGS. 5 and 6. In this construction of the suspension, the outer member 22 is eliminated and the peripheral crown portion of the load-bearing member 23′ is bonded or adhesively secured directly to the inner surface of the cylindrical wall 16 of the casing 15. The passageway 26 in the hub 24 and the associated valve 28 would thus have no function to serve and could, as indicated in FIGS. 5 and 6, be eliminated, although this is not necessary. It is, of course, essential that the load-bearing cushion member 23′ be made of a material which is considerably more extensible and flexible than the multi-ply rubber and tire cord fabric material of which the member 23 shown in FIGS. 2, 3 and 4 is made, in order to ensure that the periphery of the load-bearing member, which now also serves as the sealing means, will not be stripped at any point from the inner surface of the casing wall 16 as the wheel 12, its axle 14 and the shaft 36 are subjected to varying loads and vertical or horizontal displacements which cause the deformation of the member 23′ as shown in FIG. 6. As in the case of the two-compartment suspension, the single compartment suspension is provided with a dirt-excluding corrugated rubber sleeve or collar 38 of the type shown in FIG. 7.

It will be recognized from the foregoing description, therefore, that the suspension according to the present invention is, in any of its modified forms, designed for the shock-proof mounting of a rotating shaft which is subject to transverse movements during its rotation.

Having thus particularly described my invention, what I claim and desire to secure by Letters Patent is:

1. In an automotive vehicle having a chassis, a body supported by said chassis, a plurality of wheels, and drive elements mounted on said chassis and operatively connected with said wheels; the improvement comprising an underbody made of a watertight material rigidly secured to said chassis and extending across the latter therebelow so as to insulate said chassis and said drive elements against water and other foreign substances from the exterior of the vehicle, and a plurality of watertight suspension units rigidly connected, respectively, with said chassis interiorly of said underbody against the locations of said wheels and affording a watertight passage of the respective wheel axles from the wheels exteriorly of said underbody to said drive elements interiorly of said underbody; each of said suspension units comprising a rigid casing having a pair of opposite end walls and a peripheral wall extending therebetween, each of said end walls being provided with an aperture to permit the associated wheel axle to extend freely rotatably and radially movably through said casing, a hub disposed within said casing and provided with a substantially central bore adapted to accommodate the wheel axle with a watertight rotating seal, and a pair of inner and outer hollow, resilient members mounted on said hub within said casing and defining, respectively, an inner load-bearing element and an outer chamber within which said element is located, the outer crown surface of said outer member being secured in a watertight manner to the inner surface of said peripheral wall of said casing to seal the interior of said underbody against entry of foreign substances from exteriorly of the vehicle.

2. In an automotive vehicle according to claim 1; a hollow shaft extending through said bore in said hub in a watertight manner and affixed to said hub, the wheel axle extending through said shaft, and bearing means disposed within said shaft and rotatably supporting the wheel axle, said bearing means establishing a watertight rotating seal between said shaft and the wheel axle.

3. In an automotive vehicle according to claim 1; said inner member which constitutes said load-bearing element comprising an inflated, annular, substantially tire-shaped tube made of a multi-ply construction of rubber and tire cord fabric, and said outer member which constitutes the sealing element comprising an annular, substantially tire-shaped tube made of highly extensible butyl rubber impermeable to air and water.

4. In an automotive vehicle according to claim 3; said hub being provided at its sides adjacent said end walls of said casing with a pair of peripheral flanges, said inner member at its inner most peripheral edges having a pair of beads seated against the inner faces of said flanges, respectively, said outer member at its innermost peripheral edges being secured to said hub along the outer faces of said flanges, and said hub being further provided with a pair of valved passageways communicating, respectively, with the interiors of said inner and outer members to permit individual inflation thereof.

5. In an automotive vehicle having a chassis, a body supported by said chassis, a plurality of wheels, and drive elements mounted on said chassis and operatively connected with said wheels; the improvement comprising an underbody made of a watertight material rigidly secured to said chassis and extending across the latter therebelow so as to insulate said chassis and said drive elements against water and other foreign substances from the exterior of the vehicle, and a plurality of watertight suspension units rigidly connected, respectively, with said chassis interiorly of said underbody against the locations of said wheels and affording a watertight passage of the respective wheel axles from the wheels exteriorly of said underbody to said drive elements interiorly of said underbody; each of said suspension units comprising a rigid casing having a pair of opposite end walls and a peripheral wall extending therebetween, each of said end walls being provided with an aperture to permit a wheel axle to extend freely rotatably and radially movably through said casing, a hub disposed within said casing and provided with a substantially central bore adapted to accommodate the wheel axle with a water tight rotating seal, and a hollow, inflated, resilient member mounted in a watertight manner on said hub within said casing and defining a load-bearing element, the outer crown surface of said member being secured in a watertight manner to the inner surface of said peripheral wall of said casing to seal the interior of said underbody against entry of foreign substances from exteriorly of the vehicle.

6. In an automotive vehicle having a chassis, a body supported by said chassis, a plurality of wheels, and drive elements mounted on said chassis and operatively connected with said wheels; the improvement comprising an underbody made of a watertight material rigidly secured to said chassis and extending across the latter therebelow so as to insulate said chassis and said drive elements against water and other foreign substances from the exterior of the vehicle, and a plurality of watertight suspension units rigidly connected, respectively, with said chassis interiorly of said underbody against the locations of said wheels and affording a watertight passage of the respective wheel axles from the wheels exteriorly of said underbody to said drive elements interiorly of said underbody; each of said suspension units comprising a rigid casing having a pair of opposite end walls and a peripheral wall extending therebetween, each of said end walls being provided with an aperture to permit a wheel axle to extend freely rotatably and radially movably through said casing, a hub disposed within said casing and provided with a substantially central bore adapted to accommodate the wheel axle with a watertight rotating seal, and a pair of inner and outer resilient members mounted in a watertight manner on said hub within said casing and defining, respectively, an inner load-bearing element and an outer chamber within which said element is located, said outer member being constituted by a substantially tire-shaped tube of highly extensible butyl rubber, and the outer crown surface of said outer member being secured in a watertight manner to the inner surface of said peripheral wall of said casing to seal the interior of said underbody against entry of foreign substances from exteriorly of the vehicle.

7. A suspension for a rotatable shaft member, comprising a rigid casing having a pair of opposite end walls and a peripheral wall extending therebetween, each of said end walls being provided with an aperture to permit said shaft member to extend freely rotatably and radially movably through said casing, a hub disposed within said casing and provided with a substantially central bore adapted to accommodate said shaft member, and a pair of inner and outer resilient members mounted on said hub within said casing and defining, respectively, an inner load-bearing element and an outer chamber within which said element is located, the outer crown surface of said outer member being secured to the inner surface of said peripheral wall of said casing.

8. A suspension according to claim 7, further comprising a hollow shaft extending through said bore in said hub, and affixed to said hub, and bearing means disposed within said hollow shaft and adapted to rotatably support said shaft member.

9. A vehicle wheel suspension, comprising a rigid casing having a pair of opposite end walls and a peripheral wall extending therebetween, each of said end walls being provided with an aperture to permit a wheel axle to extend freely rotatably and radially movably through said casing, a hub disposed within said casing and provided with a substantially central bore adapted to accommodate the wheel axle with a watertight rotating seal and a pair of inner and outer resilient members mounted on said hub within said casing and defining, respectively, an inner load-bearing element and an outer chamber within which said element is located, the outer crown surface of said outer member being secured in a watertight manner to the inner surface of said peripheral wall of said casing.

10. A suspension according to claim 9, said outer member comprising an annular substantially tire-shaped tube made of butyl rubber and having a great degree of extensibility as well as being impermeable to water and air.

11. A suspension according to claim 10, said inner member comprising a substantially tire-shaped hollow tube inflated to a high pressure.

12. A suspension according to claim 11, said inner member being made of a multi-ply construction of rubber and tire cord fabric, with the tire cords being oriented at a bias to the crown center line of said inner member.

13. A suspension according to claim 9, further comprising a hollow shaft extending through said bore in said hub in a watertight manner and affixed to said hub, whereby the wheel axle may extend through said shaft, and bearing means disposed within said shaft and adapted to rotatably support the wheel axle and to establish a watertight rotating seal between said shaft and the wheel axle.

References Cited in the file of this patent

UNITED STATES PATENTS

| 1,439,617 | Dobbins et al. | Dec. 19, 1922 |
| 1,752,200 | Raimondi | Mar. 15, 1930 |
| 1,900,439 | Fergusson | Mar. 7, 1933 |
| 2,031,862 | Smith | Feb. 25, 1936 |
| 2,032,697 | Golden | Mar. 3, 1936 |
| 2,050,157 | Brockman | Aug. 4, 1936 |
| 2,887,732 | Kloote et al. | May 26, 1959 |
| 2,894,783 | Bird | July 14, 1959 |

FOREIGN PATENTS

| 811,235 | Great Britain | Apr. 2, 1959 |